US012625727B2

(12) United States Patent
Asefi et al.

(10) Patent No.: US 12,625,727 B2
(45) Date of Patent: May 12, 2026

(54) CHANGE MANAGEMENT INTELLIGENT RECONCILIATION

(71) Applicant: Wells Fargo Bank, N.A., San Francisco, CA (US)

(72) Inventors: Azita Asefi, Vacaville, CA (US); Preet Pratik Panda, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 219 days.

(21) Appl. No.: 18/329,911

(22) Filed: Jun. 6, 2023

(65) Prior Publication Data

US 2024/0411588 A1 Dec. 12, 2024

(51) Int. Cl.
*G06F 9/48* (2006.01)
*G06F 21/57* (2013.01)

(52) U.S. Cl.
CPC .......... *G06F 9/4881* (2013.01); *G06F 21/577* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 11,017,321 B1 | 5/2021 | Mishra et al. | |
| 11,206,179 B1 | 12/2021 | Rathore et al. | |
| 11,290,325 B1 * | 3/2022 | Kaluza | H04L 41/142 |
| 11,418,571 B1 * | 8/2022 | Singh | H04L 67/535 |
| 2004/0260718 A1 | 12/2004 | Fedorov | |
| 2006/0184410 A1 | 8/2006 | Ramamurthy et al. | |
| 2007/0083872 A1 | 4/2007 | Doshi | |
| 2007/0100712 A1 | 5/2007 | Kilpatrick et al. | |
| 2007/0185746 A1 | 8/2007 | Chieu et al. | |
| 2011/0107300 A1 | 5/2011 | Vidal et al. | |
| 2016/0328247 A1 * | 11/2016 | Uriel | G06F 11/3024 |
| 2017/0243117 A1 | 8/2017 | Kephart et al. | |

(Continued)

OTHER PUBLICATIONS

Choi et al. "The Engineering Machine-Learning Automation Platform (EMAP): A Big-Data-Driven AI Tool for Contractors' Sustainable Management Solutions for Plant Projects" Sustainability Jul. 2, 2021, pp. 33. https://doi.org/10.3390/su131810384.

*Primary Examiner* — Syed A Roni
(74) *Attorney, Agent, or Firm* — Merchant & Gould P.C.

(57) ABSTRACT

A computer system for a change management intelligent reconciliation platform configured to support the change management process. The computer system includes a task mining agent, an intelligence reconnaissance service, an insight service, and a notification service. The task mining agent is programmed to passively log user actions related to a change request. The intelligence reconnaissance service filters the logged actions and identifies patterns and anomalies in user behavior. The insight service analyzes the differences between the filtered actions and one or more prescribed actions related to the change request, and generates one or more reconciliation insights based on the results of the analysis. The notification service generates one or more notifications regarding the generated reconciliation insights to provides valuable insights into user behavior data and to aid in identifying potential risks or issues during the change implementation process.

18 Claims, 5 Drawing Sheets

300

Passively Log Actions 302

Filter Logged Actions 304

Analyze Differences between Filtered Actions and Prescribed Actions 306

Generate Notifications 308

(56)        References Cited

U.S. PATENT DOCUMENTS

| | | |
|---|---|---|
| 2019/0236459 A1 | 8/2019 | Cheyer et al. |
| 2019/0258985 A1 | 8/2019 | Guastella et al. |
| 2020/0257522 A1 | 8/2020 | Cheng et al. |
| 2021/0144168 A1* | 5/2021 | Vester ..................... G06F 9/451 |
| 2021/0182046 A1 | 6/2021 | Paralikar |

* cited by examiner

300

Passively Log Actions 302

Filter Logged Actions 304

Analyze Differences between Filtered Actions and Prescribed Actions 306

Generate Notifications 308

CHANGE MANAGEMENT INTELLIGENT RECONCILIATION

BACKGROUND

When a task is performed on a server, the support team creates a change request and task to document the supporting work, which includes an implementation plan based on previous events or a standard operating procedure. The problem is that even though the actual steps are laid out, there is no way to confirm the actual activity that was performed on the server by the support team.

SUMMARY

A lightweight, configurable task mining agent can be used to passively log events/actions that a user performs on the server. The task mining agent then notifies an intelligence reconnaissance service and insight service that uses one or more custom Artificial Intelligence (AI), Machine Learning/ Natural Language Processing (ML/NLP) models and/or decision engines to filter noise from the captured results, and to reconcile the captured results with actual steps, providing real-time insights and notifications of the steps performed and additional alerting if a step introduces risks or vulnerabilities, thereby enabling unintended risks to the system to be identified in real-time.

Examples provided herein are directed to a computer system designed for a change management intelligent reconciliation platform. The system includes one or more processors and non-transitory computer-readable storage media containing instructions that enable the creation of components, including a task mining agent programmed to passively log actions related to a change request, an intelligence reconnaissance service programmed to filter the logged actions, an insight service configured to analyze differences between the filtered actions and one or more prescribed actions related to the change request to generate one or more reconciliation insights, and a notification service configured to generate one or more notifications regarding the generated reconciliation insights. This system provides valuable insights into user behavior data and helps identify potential risks or issues during the change implementation process.

Examples provided herein are further directed to a computer program product residing on a computer-readable medium. The product includes a plurality of instructions that, when executed by a processor, cause the processor to perform several operations. These operations begin with passively logging actions related to a change request. The logged actions are then filtered to remove irrelevant data and identify relevant information. Next, differences between the filtered actions and one or more prescribed actions related to the change request are analyzed to generate one or more reconciliation insights. Finally, one or more notifications are generated regarding the generated reconciliation insights. This program product provides a powerful tool for identifying potential risks or issues during the change implementation process and ensuring that changes are implemented correctly and with minimal impact to the system.

Examples provided herein are further directed to a computer-implemented method executed on a computing device. The method includes several steps, beginning with passively logging actions related to a change request. The logged actions are then filtered to remove noise and identify relevant data. Next, differences between the filtered actions and one or more prescribed actions related to the change request are analyzed to generate one or more reconciliation insights. Finally, one or more notifications are generated regarding the generated reconciliation insights. This method provides an efficient and effective way to identify potential risks or issues during the change implementation process, ensuring that changes are implemented correctly and with minimal impact to the system.

In some examples, the task mining agent is configured to capture user interactions and system events performed or executed by a user or class of users. In some examples, the activities related to a change request can include a variety of interactions, such as mouse clicks, keystrokes, touch screen inputs, dropdown menu selections, scrolling, keyboard shortcuts, and more. In some examples, the task mining agent can be designed to use minimal system resources, such as less than about 5% of the processor, less than about 50-100 Megabytes (MB) of memory, or less than about 100-500 MB of disk space for installation and operation when running in the background.

In some examples, intelligence reconnaissance service can be designed to use machine learning algorithms to analyze user behavior data and identify patterns and anomalies in the passively logged actions. In some examples, intelligence reconnaissance service can identify activities related to a change request through contextual analysis. In some examples, reconciliation insights generated by the system can include information on whether specific tasks associated with the change request have been performed and whether an action taken in response to the change request creates a system vulnerability.

In some examples, to determine whether an action taken in response to the change request creates a system vulnerability, the insight service can be configured to analyze code or configuration changes made in response to the change request for comparison to known vulnerability patterns or standards. In some examples, the notifications provided by the system can take the form of real-time alerts, summary reports, or custom notifications, depending on the needs of the user.

Details of one or more techniques are set forth in the accompanying drawings and the description below. Other features, objects, and advantages of these techniques will be apparent from the description, drawings, and claims.

DETAILED DESCRIPTION

Figure 1:
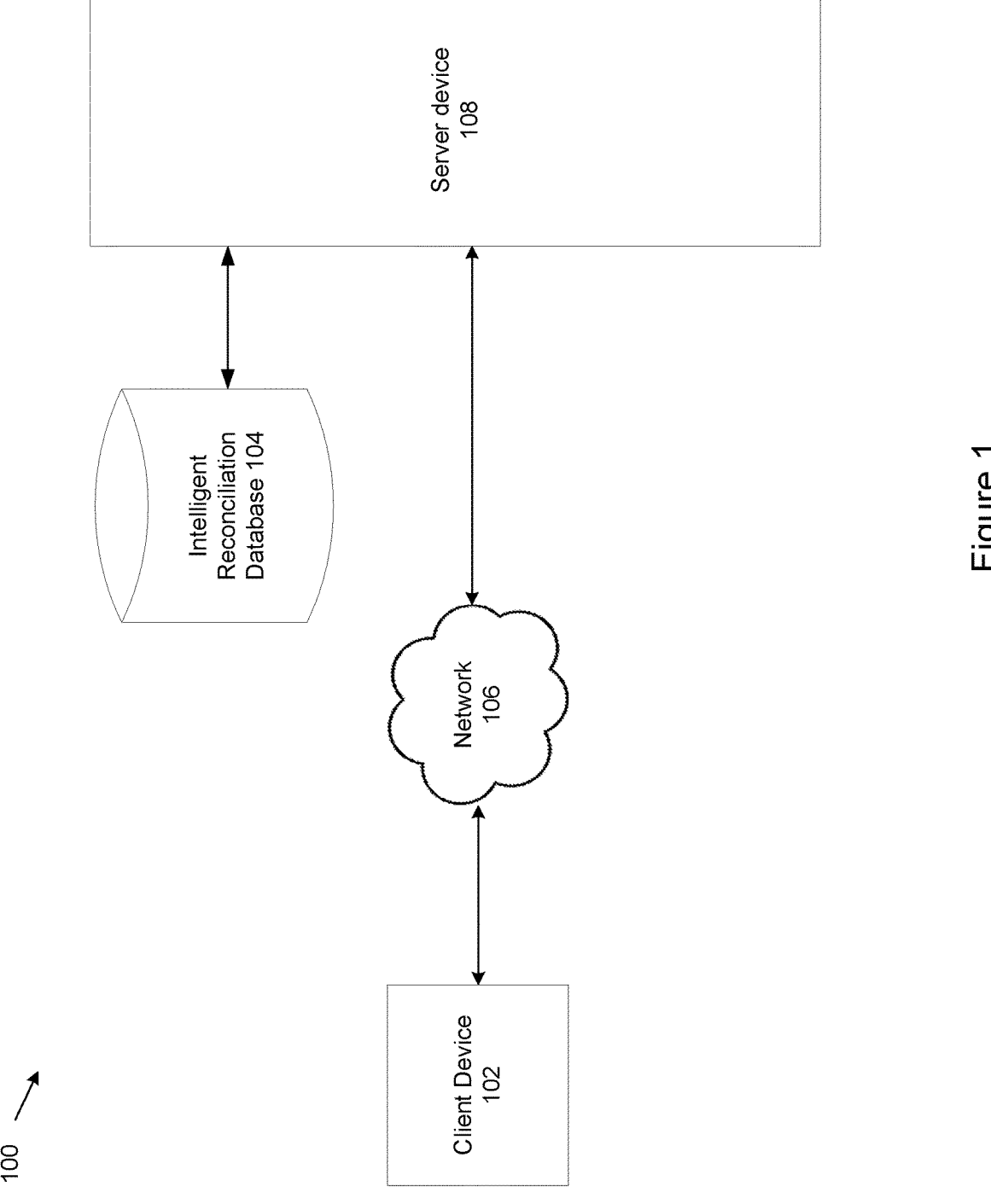
FIG. 1 shows an example system for implementing a change management intelligent reconciliation platform.

This disclosure relates to a computer system for a change management intelligent reconciliation platform. The example change management intelligent reconciliation platform, as disclosed herein, can provide valuable insights into user behavior data, identify potential risks or issues during a change implementation process, and ensure that changes are implemented correctly and with minimal impact to the system.

The process of performing a task on a server typically involves a support team creating a change request to document the work performed. In general, the term "task" refers to a piece of work or an assignment that needs to be accomplished. In the context of a server, the term task refers to a specific set of actions or steps that need to be performed in order to maintain, update, or troubleshoot the server. Nonlimiting examples of tasks include installing software updates, configuring settings, or fixing issues.

A "change request" generally refers to a process for documenting and tracking changes made to the server. For example, a change request can be a formal request for a change to be made to the server, which can outline a series of specific actions to be performed in order to implement the change. In some embodiments, the change request can contain a step-by-step plan for how the change will be implemented, including the specific actions that need to be taken and the expected outcome. The step-by-step plan can be based on previous events, or can follow a standard operating procedure for implementation of a task. The change request can additionally provide an overview or outline the proposed change, provide one or more reasons for making the change, or facilitate any necessary approvals or sign-offs for completion of the plan. In general, the change request documentation attempts to ensure that changes to the server are made in a controlled and deliberate manner, while following an established protocol.

Traditionally, the only way to assess the correlation between the actual steps taken in task execution and the specific actions outlined in the change request's step-by-step plan was through a laborious review conducted by a supervisor or third-party. This raises several concerns, such as the possibility of key steps being missed, the introduction of additional steps, or the performance of steps in an incorrect sequence or order, each of which can introduce vulnerabilities. These vulnerabilities, if not detected in a timely manner, can pose a threat to the server and the company operating the server. Moreover, there has been no systematic method to monitor the actions taken in response to change requests as they are performed, leading to a general lack of accountability and transparency in the process.

Embodiments of the present disclosure address this concern through the creation of a computer system and method for a change management intelligent reconciliation platform. In embodiments, the system and method can employ one or more processors and non-transitory computer readable storage media encoding instructions. When executed by the processors, the instructions cause the computer system to passively log actions related to a change request, filter the logged actions, analyze differences between the filtered actions and prescribed actions, and generate notifications regarding the reconciliation insights generated.

Accordingly, the change management intelligent reconciliation program presents a solution to the issue of lacking accountability and transparency in the change management process by providing automatic auditing and reconciliation of actions taken in response to change requests. Other nonlimiting applications of the change management intelligent reconciliation program include:

monitoring and reconciling IT operations, ensuring that all actions taken in response to IT incidents are performed correctly and efficiently, monitoring and reconciling actions taken to comply with regulations, standards, or policies, monitoring and reconciling actions taken in response to project tasks, ensuring that all steps are taken in the correct sequence and order, monitoring and reconciling actions taken in response to supply chain events, ensuring that all steps are performed efficiently and effectively, and monitoring and reconciling actions taken in response to quality events, ensuring that all steps are performed correctly and in compliance with regulations and standards.

Additionally, the change management intelligent reconciliation platform offers a solution for identifying cycle time and touch analysis to complete change requests, along with reducing swivel chair operations, which can help address the inefficient and manual process of switching between multiple computer systems or applications to complete a task or change request.

These are just a few examples of the potential applications of the change management intelligent reconciliation program. In other embodiments, the program can be adapted to a wide range of use cases to provide automatic auditing and reconciliation of actions taken in response to various types of events.

Figure 2:
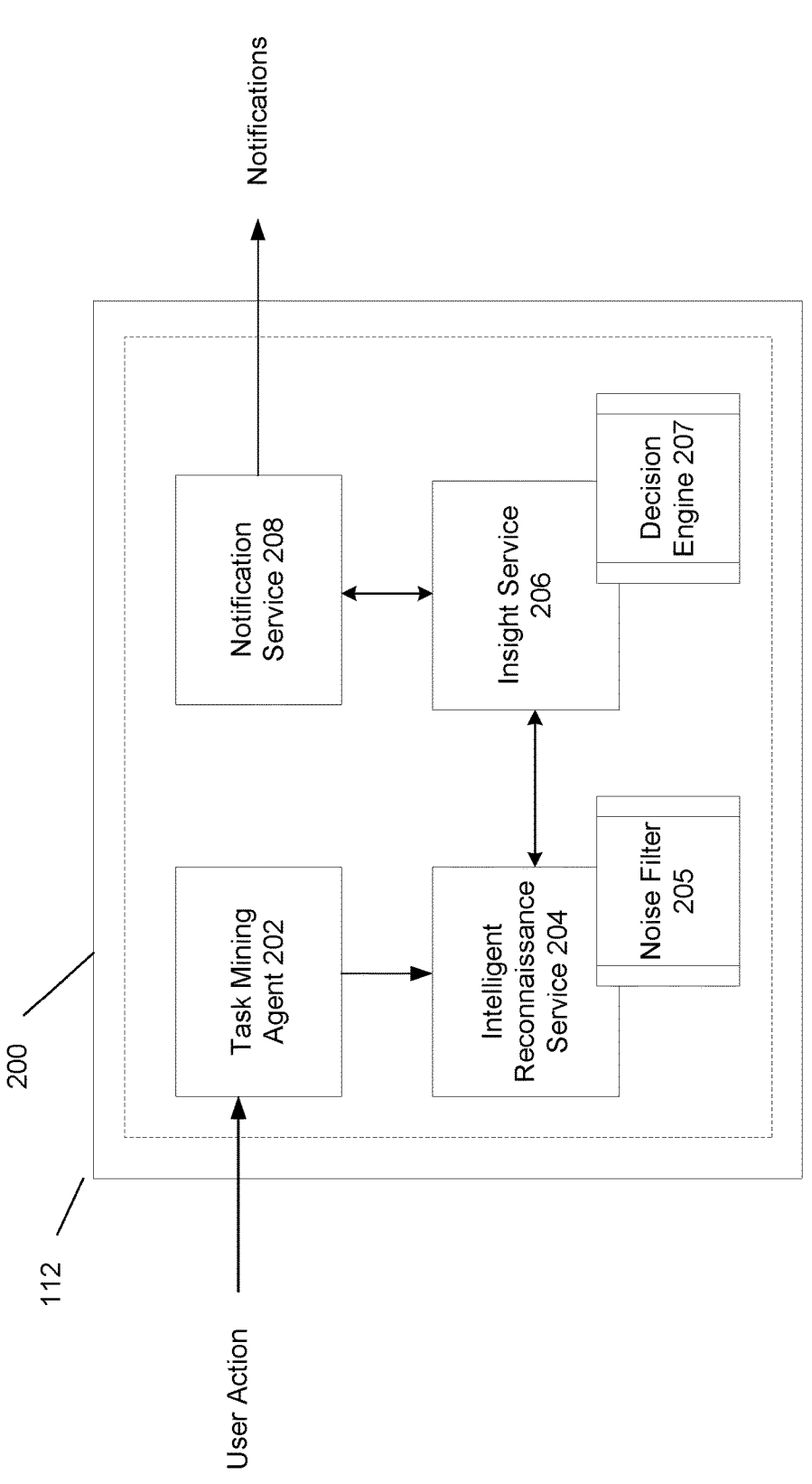
FIG. 2 shows example logical components of a server device of the example system of FIG. 1.

FIG. 1 schematically shows aspects of an example system 100 programmed to generate and operate the change management intelligent reconciliation platform 200 (depicted in FIG. 2). System 100 may include client device 102, intelligent reconciliation database 104, network 106, and server device 108.

Each of the client and server devices may be implemented as one or more computing devices with at least one processor and memory. Example computing devices include a mobile computer, a desktop computer, a server computer, or other computing device or devices such as a server farm or cloud computing used to generate or receive data.

The client device 102 is programmed to communicate with server device 108. Client device 102 may be further programmed to run one or more applications. In some examples, the applications running on client device 102 may communicate with server device 108. Client device 102 may request services from server device 108. Requests for services may be commands issued by a user or requests from an application running on client device 102.

Client device 102 provides a user access to programs and services provided by server device 108. Client device 102 may provide a particular user, such as the administrator, access to and control of programs and services on server device 108 based on credentials associated with the particular user. For example, a particular user, such as an administrator, may request administrative services that enable the administrator to manage a program maintained on server device 108. The administrators request for administrative services may only be granted if credentials are provided.

The intelligent reconciliation database 104 is programmed to provide storage data related to operation of the change management intelligent reconciliation platform 200. For example, the intelligent reconciliation database 104 may store logged actions related to a change request, filtered actions, prescribed actions, reconciliation insights, notifications, as well as one or more noise filters, AI, ML/NLP models and/or decision engines trained to perform intelligent reconciliation actions and services. Intelligent reconciliation database 104 may store logged actions, filtered actions, prescribed actions, reconciliation insights, and notifications as byte chucks, such as using an Extensible Markup Language (XML) or JavaScript Object Notation (JSON) format.

In examples, the one or more noise filters, AI, ML/NLP models, and/or decision engines trained to perform intelligent reconciliation actions and services may be written and stored using serialized object formats, binary file formats, or any other format that allows them to be easily loaded and executed by the system. The specific format used will depend on the implementation details and requirements of the system. For example, decision engines may be stored as executable code or scripts, while noise filters may be stored as configuration files or rules in a database. Ultimately, the choice of storage format will depend on factors such as performance, scalability, and case of maintenance and integration with other system components.

The server device 108 is programmed to communicate with client device 102 and intelligent reconciliation database 104. Server device 108 is further programmed to run and maintain programs and services. Server device 108 may communicate with intelligent reconciliation database 104 to store and retrieve stored data. Server device 108 may communicate with client device 102 to provide requested services to client device 102.

The network 106 provides a wired and/or wireless connection between the client device 102, and the server device 108. In some examples, the network 106 can be a local area network, a wide area network, the Internet, or a mixture thereof. Many different communication protocols can be used. Although only two devices are shown, the system 100 can accommodate hundreds, thousands, or more devices.

The technology described herein results in the technical solution of a comprehensive change management intelligent reconciliation platform that automates and streamlines the process of reconciling changes made to a system by combining passive logging, intelligent filtering, automated analysis, and targeted notifications to improve the efficiency and accuracy of the reconciliation process.

Among other advantages, the technical improvements in the present disclosure provide a system designed to ensure that changes made to a server are implemented correctly with minimal impact on the system. The system achieves this goal by providing valuable insights into user behavior, identifying potential risks or issues during the change implementation process, and monitoring and reconciling actions taken in response to change requests. By automating and streamlining the change management process, the system ensures that changes are implemented correctly, efficiently, and in compliance with established protocols and standards. Further advantages of the system are described in more detail below.

Referring now to FIG. 2, additional details of the server device 108 are shown. In this example, the server device 108 has logic modules that assist with the generation and operation of the change management intelligent reconciliation platform 200. Server device 108 may include task mining agent 202, intelligence reconnaissance service 204 including one or more noise filters 205, insight service 206 including one or more decision engines 207, and notification service 208.

Performing tasks on a server typically involves a support team creating a change request to document a task to be performed. A task, in this context, refers to a specific set of actions or steps required to maintain, update, or troubleshoot the server. Examples of tasks include installing software updates, configuring settings, or fixing issues.

A change request is a formal request to make changes to the server, which is documented and tracked by the change management intelligent reconciliation platform 200 throughout the change implementation process. The change request can include a step-by-step plan for how the change will be implemented, including the specific actions to be taken and the expected outcome. The plan may be based on previous events or follow a standard operating procedure for task implementation. The change request may also outline the proposed change, provide reasons for making the change, or facilitate approvals or sign-offs for the plan's completion.

To carry out a change request, a network administrator or support team member communicates with the server device 108 to perform a series of steps or actions required to complete the task. An Information Technology Service Management (ITSM) solution platform, such as ServiceNow, BMC Helix ITSM, Jira Service Desk, Freshservice, Cherwell Service Management, or Ivanti ITSM, may be configured on one or more client devices 102 to enable administrators to make change requests to the server device 108 and manage IT service requests, incidents, changes, and other aspects of ITSM.

Access to programs and services on the server device 108 is granted to a particular user, such as an administrator, based on their credentials. In some embodiments, the ITSM solution platform may authorize a request for administrative services upon providing the necessary credentials, such as user credentials or change request authorization.

Thereafter, the task mining agent 202 can passively log actions related to the change request. For example, the task mining agent 202 can capture user interactions and system events performed or executed by a particular user or class of users, based on their credentials or access criteria. In embodiments, the task mining agent 202 operates passively, logging actions related to the change request in a non-intrusive manner.

Nonlimiting examples of passively logged actions include interactions with a mouse, keyboard keystrokes, touch screen interactions, dropdown menu selections, scrolling through webpages or documents, using keyboard shortcuts to perform actions, moving the mouse to a specific location on a display, dragging and dropping files or objects, copying and pasting text or content, or changing the layout of an interface. The task mining agent 202 can use vendor event capture tools like Epiplex or Celonis, or open-source keyloggers to capture every keystroke and click.

The task mining agent 202 is designed to operate efficiently and is optimized for minimal resource consumption. In some embodiments, the task mining agent 202 can run in the background without causing significant performance degradation to other processes and applications. In some embodiments, the task mining agent 202 uses less than about 5% of the one or more processors, less than about 50-100 MB of memory, or less than about 100-500 MB of disk space for installation and operation. If the process of passively logging actions is interrupted or significantly deviates from normal operation, such as requiring more than the usual amount of processing power, the task mining agent 202 can provide a notification. This feature ensures that any issues with the logging process can be identified and addressed promptly, enabling the system to continue operating optimally.

Capturing all user actions can result in a large amount of data that can be difficult and time-consuming to analyze effectively. Accordingly, in embodiments, the intelligence reconnaissance service 204 can be programmed to filter the actions logged by the task mining agent, for example via noise filter 205. Filtering the user actions prior to further processing, allows the change management intelligent reconciliation platform 200 to focus on the relevant actions related to the change request.

By applying one or more filters, the intelligence reconnaissance service 204 can reduce the amount of data to a manageable level, which makes it easier to identify patterns, trends, and anomalies. In some embodiments, the filtered actions can include only the actions relevant to the change request, such as interactions with the software or hardware that the change request is intended to affect. Filtering the captured user actions in this manner enables a more targeted analysis, which can be used to identify potential issues, risks, or inefficiencies that may need to be addressed.

Filtering also allows the intelligence reconnaissance service 204 to remove noise or irrelevant actions that may not be related to the change request. For example, actions taken by the user while performing other tasks or actions performed by other users may not be relevant to the change request and can be filtered out, thereby resulting in a cleaner dataset, which can lead to more accurate insights and recommendations.

In some embodiments, the intelligence reconnaissance service 204 can send notifications to the server device 108 using a secure channel for all events that it detects. To further enhance notifications to other systems, an event-based queue like Kafka can be introduced in between the intelligence reconnaissance service 204 and the server device 108, to allow for more efficient and effective communication between different systems and components within the change management intelligent reconciliation platform 200.

In one embodiment, the noise filter 205 can be a rule-based filter which utilizes predefined rules to detect specific patterns of user behavior (e.g., repetitive clicking of a particular button, erroneous input in a form field, etc.). A rule-based filter is typically composed of a set of predefined rules that are designed to identify specific patterns of user behavior. Each rule in the filter specifies a particular behavior or pattern of behavior to look for and a corresponding action to take if the behavior is detected. The rules can be based on simple criteria such as keywords, phrases, or specific data values, or more complex criteria that take into account multiple factors or patterns of behavior over time.

When the filter is applied to user behavior data, each action performed by the user is compared against the set of rules in the filter, and if a match is found, the corresponding action specified in the rule is taken. For example, a rule-based filter might be configured to flag any user who attempts to log in with an incorrect password three or more times in a row and take action to block further login attempts from that user.

In one embodiment, the noise filter 205 can be a statistical filter using statistical methods to identify patterns and anomalies. A statistical filter analyzes user behavior data using statistical methods to identify patterns and anomalies, involving steps such as data collection, preprocessing, feature extraction, statistical analysis, pattern identification, filtering, and output generation. The filter collects user behavior data, preprocesses it, extracts relevant features, applies statistical techniques, identifies patterns and anomalies, filters out noise, and generates an output such as visualizations, reports, or alerts.

In one embodiment, the noise filter can be a machine learning algorithm trained to analyze user behavior and identify patterns and abnormalities in the logged actions. Machine learning is a subfield of computer science that enables computers to learn from data without being explicitly programmed. The algorithm used in this model may belong to a class of computing called deep learning, which attempts to model high-level abstractions in data. The neural networks used in this model consist of multiple layers that perform algorithms or transformations, and the number of layers can range from two to a few tens, depending on the use case. Modern neural network projects typically involve thousands to millions of neural units and connections.

In a neural network, each neuron in a layer can be connected to every neuron in the next layer through a connection, and the weights and biases of the neurons can be adjusted as the network learns to accurately classify observed parameters. To compute an output value, the neural network can use various mathematical functions such as linear, sigmoid, tanh, rectified linear unit, or other functions that prevent extreme output values that can destabilize the network. The output can be in the form of numerical values, graphical output, or alphanumeric text.

Training the neural network involves using a cost function, such as a quadratic or cross-entropy cost function, to determine the accuracy of the network's output compared to known training data. A backpropagation algorithm is used to calculate the gradient descent of the cost function to locate the global minimum and compute the partial derivative of the cost function with respect to the weights and biases. Changes to the weights and biases can be limited by a learning rate to prevent overfitting, and regularization methods like L1 and L2 can be used to help minimize the cost function.

The inputs to the neural network for filtering logged actions could be the raw data collected by the task mining agent, which includes all user actions related to the server. The outputs from the neural network could be a filtered set of user actions that are relevant to the change request, with any noise or irrelevant data removed. In other words, the neural network could be trained to identify patterns in user behavior that are associated with a change request and filter out any user actions that are not relevant.

To train a neural network to filter logged actions, a dataset of labeled examples is needed. This dataset includes input features representing the captured user actions, and output labels indicating whether each action is relevant to the change request or not. Nonlimiting examples of input features include information such as mouse movements, keystrokes, and interface interactions, while the output labels can indicate whether each action is relevant to the change request or not.

Once the dataset is prepared, the neural network can be trained using the backpropagation algorithm to learn how to classify the input features into relevant or irrelevant actions. The training process involves adjusting the weights and biases of the neural network based on the error between the predicted output and the actual output. After the neural network is trained, the neural network can be used to filter the captured user actions by feeding the actions as input to the neural network, which will output a prediction of whether the action is relevant or irrelevant to the change request. The output predictions can then be used to filter out irrelevant actions, leaving only the actions relevant to the change request.

In one embodiment, the noise filter 205 can be a natural language processing filter configured to identify activities related to a change request through contextual analysis. A natural language processing (NLP) filter is a type of filter that analyzes and processes natural language text data to identify patterns and extract relevant information. The basic structure of an NLP filter involves several steps. First, the NLP filter breaks down the input text into smaller units called tokens, which can be individual words or phrases. Next, the NLP filter assigns a part of speech to each token in the text, such as noun, verb, adjective, etc. This helps to identify the grammatical structure of the text. Then, the NLP filter identifies and extracts entities such as people, organizations, locations, etc. mentioned in the text.

The NLP filter also analyzes the text to determine the sentiment or tone of the content, such as positive, negative, or neutral. Additionally, the NLP filter analyzes the grammatical relationships between the words in the text to understand the overall meaning and structure of the content. Based on the results of the above steps, the NLP filter filters out noise or irrelevant data and retains the relevant data for further processing. Finally, the NLP filter generates an output, which may include visualizations, reports, or alerts, to inform users of the identified patterns and anomalies.

A natural language processing (NLP) filter can be trained to filter logged actions using supervised or unsupervised learning techniques. In supervised learning, the filter is trained on a labeled dataset, where the input text data is labeled as either relevant or irrelevant to the specific task (in this case, identifying actions related to change requests). The filter can be trained using a dataset of labeled examples, where the input text data is labeled as either relevant or irrelevant to the specific task (in this case, identifying actions related to change requests). The training data can be preprocessed using the basic steps of an NLP filter, such as tokenization, POS tagging, NER, and sentiment analysis, to extract relevant features from the text. The labeled examples can then be used to train a machine learning model, such as a decision tree or a neural network, to classify new input text data as relevant or irrelevant.

During the training process, the model adjusts its weights and biases based on the labeled examples in order to minimize its prediction error. Once the model is trained, it can be used to classify new input text data as relevant or irrelevant. The output of the model can then be used to filter out irrelevant logged actions and retain only the relevant actions related to change requests. The model can be further refined and improved by using additional training data and adjusting its parameters, such as the number of layers or the learning rate.

In unsupervised learning, the NLP filter is trained on an unlabeled dataset without any expected output labels. The filter learns to identify patterns and features in the data on its own. For example, an unsupervised learning algorithm can be used to cluster similar words or phrases together based on their semantic meaning. In both supervised and unsupervised learning, the training process typically involves several steps such as data preprocessing, feature extraction, model selection, and hyperparameter tuning. The performance of the trained filter is evaluated on a separate validation dataset to ensure that it can generalize well to new, unseen data. The NLP filter can also be fine-tuned using transfer learning, where a pre-trained model is adapted to a new task with a smaller labeled dataset. This approach can save computational resources and training time while still achieving good performance on the new task.

The insight service 206 is designed to generate reconciliation insights by analyzing the differences between the filtered user actions and the prescribed actions related to the change request. The change request typically includes a step-by-step plan outlining the specific actions required to implement the change, based on previous events or following a standard operating procedure. The change request documentation ensures that changes are made in a controlled and deliberate manner, following an established protocol, and may provide an overview of the proposed change, reasons for making the change, or facilitate necessary approvals or sign-offs for completion of the plan.

The insight service 206 can generate reconciliation insights by analyzing the differences between the filtered user actions and the prescribed actions. These insights can take various forms, such as identifying discrepancies between the actual and prescribed actions, highlighting potential issues or errors in the implementation of the change, or providing feedback on the effectiveness of the prescribed actions in achieving the desired outcome of the change request. They can also indicate whether specific tasks associated with the change request have been performed and whether an action taken in response to the change request creates a system vulnerability. For example, the insight service 206 can be programmed to examine code or configuration changes made in response to the change request and compare them to known vulnerability patterns or standards.

In some embodiments, the insight service 206 can employ a decision engine 207 loaded with one or more algorithms that can be used to analyze the differences between the filtered user actions and the prescribed actions. One such algorithm is a decision tree, which can be used to identify the most significant factors contributing to the discrepancies between the actual and prescribed actions. Another algorithm is a clustering algorithm, which can group the filtered user actions and prescribed actions into clusters based on their similarities and differences. A regression analysis can be used to model the relationship between the filtered user actions and the prescribed actions, which can provide insights into the effectiveness of the prescribed actions in achieving the desired outcome of the change request. Additionally, anomaly detection algorithms can be used to identify unusual or unexpected patterns in the filtered user actions and prescribed actions, which can indicate potential issues or errors in the implementation of the change.

In one embodiment, the decision engine 207 can be programmed with a neural network to analyze the differences between the filtered user actions and the prescribed actions using a supervised learning approach. In this approach, the neural network is provided with a labeled dataset, where each data point contains a set of filtered user actions and a set of prescribed actions related to the change request, along with the associated reconciliation insights. The neural network then learns to map the input (filtered user actions and prescribed actions) to the output (reconciliation insights) by adjusting its internal parameters through backpropagation and gradient descent.

The neural network can be designed to have multiple layers, with each layer performing a specific computation or transformation of the input data. The number of layers and the specific architecture of the neural network can be chosen based on the complexity of the task and the amount of data available. For example, a deep neural network with multiple layers can be used to capture complex relationships between the input and output data.

During training, the neural network minimizes a cost function that measures the difference between the predicted output and the actual output. The cost function can be chosen based on the specific task, and common examples include mean squared error and cross-entropy loss. A backpropagation algorithm is used to compute the gradient of the cost function with respect to the internal parameters of the neural network, which is then used to update the parameters through gradient descent.

Once the neural network is trained, it can be used to predict the reconciliation insights for new sets of filtered user actions and prescribed actions related to the change request. The predicted insights can then be compared to the actual insights to evaluate the performance of the neural network. If the performance is not satisfactory, the neural network can be retrained with a larger or more diverse dataset, or the architecture of the neural network can be modified.

In one embodiment, the decision engine 207 can be programmed with a natural language processing algorithm to analyze input text and identify the most important information. The NLP algorithm breaks down the text into smaller units, identifies key topics, keywords, and phrases, and selects the most relevant information using machine learning techniques to generate a summary that captures the main points of the original text. The algorithm considers factors such as sentence structure, word frequency, and context to produce a coherent and concise summary that accurately reflects the content of the original text. Additionally, the NLP algorithm can include various components such as the input interface, NLP algorithm, summary generation engine, output interface, and review and edit functionality.

The NLP algorithm can be trained to analyze the differences between the filtered user actions and the prescribed actions by using supervised learning techniques. The first step involves collecting a large dataset of text examples that represent the different types of differences between the filtered and prescribed actions. These examples can be labeled with the correct classification for each type of difference, such as "discrepancy." "potential issue," "effective outcome," or "task completion."

Next, the dataset is preprocessed by tokenizing the text and applying techniques such as stemming and stop-word removal. The preprocessed dataset can then be split into a training set and a testing set. The training set is used to train the NLP algorithm using a variety of techniques, such as bag-of-words models, word embeddings, or neural networks. During the training process, the algorithm can learn to recognize patterns and relationships in the text data, which can enable it to classify new examples of differences between the filtered and prescribed actions. The algorithm's performance can be evaluated using the testing set to measure its accuracy, precision, recall, and F1 score.

Once the NLP algorithm is trained, it can be integrated into the insight service 206 to automatically analyze the differences between the filtered and prescribed actions in real-time. The algorithm can output the classification results, which can be used to generate reconciliation insights for the change request. Over time, the NLP algorithm can be retrained using new examples of differences to improve its accuracy and keep up with changing patterns in the data.

The notification service 208 generates notifications regarding the reconciliation insights produced. These notifications can be in the form of real-time alerts, summary reports, or custom notifications, which can be communicated to one or more client devices 102. For example, real-time alerts can be sent as soon as an insight or reconciliation is generated and inform users of potential risks or issues that require immediate attention. Summary reports can provide an overview of the insights and reconciliations generated over a specified period of time and are useful for management or other stakeholders who need to stay informed about the progress of the change management process. Custom notifications can be generated based on specific criteria and can include different types of information, such as the severity of an issue or the importance of a particular reconciliation insight. In some embodiments, notification service 208 is configured to update the change request with actual steps followed and highlights deviations, while creating incidents and notifying teams of vulnerable steps.

Figure 3:
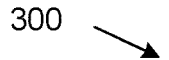
FIG. 3 shows a flowchart of an example method for intelligent reconciliation using the example system of FIG. 1.
Figure 3:
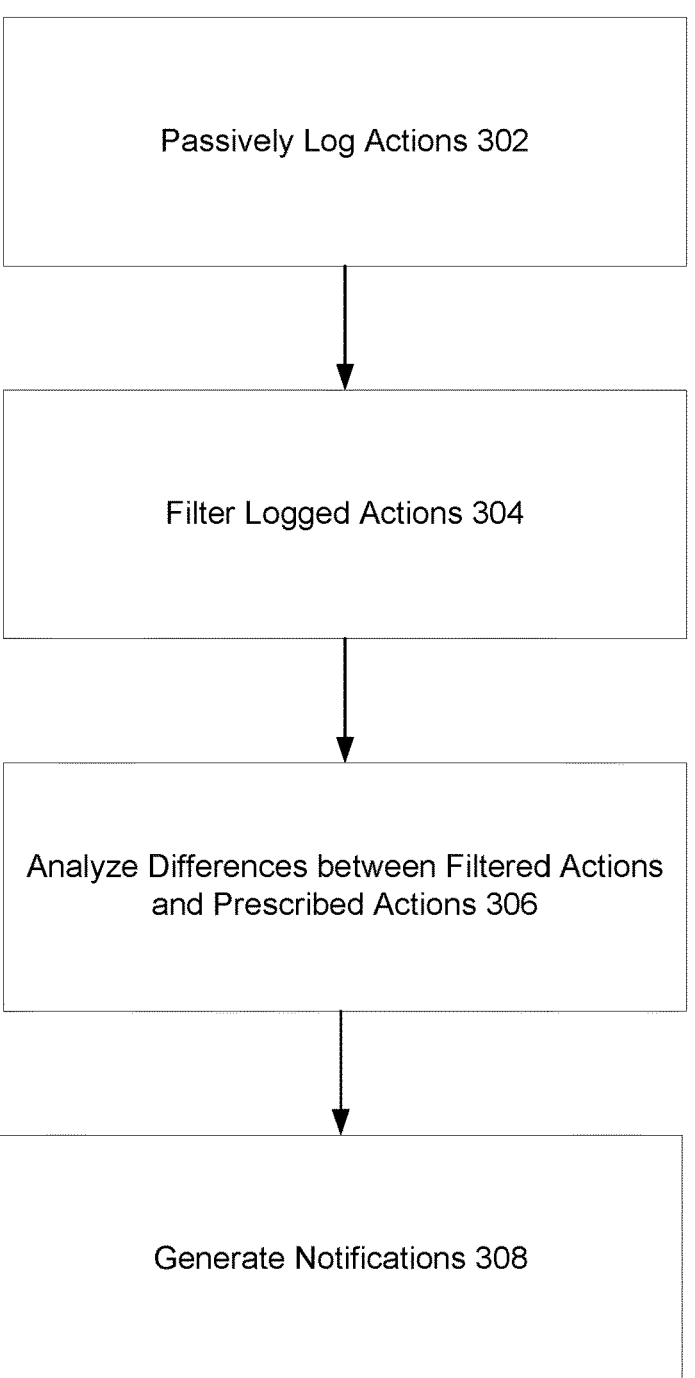

Referring now to FIG. 3, an example process 300 is shown for change management intelligent reconciliation. Process 300 addresses issues of accountability and transparency in the change management process by providing automatic auditing and reconciliation of actions taken in response to change requests. Process 300 also has various nonlimiting applications, including monitoring and reconciling IT operations, compliance with regulations and standards, project tasks, supply chain events, and quality events. In addition, process 300 can identify cycle time and touch analysis to complete change requests while reducing swivel chair operations. This can help eliminate the inefficient and manual process of switching between multiple computer systems or applications to complete a task or change request.

At 302, user actions performed in response to or related to a change request are passively logged. For example, the process 300 can capture user interactions and system events executed by a specific user or group of users, based on their credentials or access criteria. Passively logged actions include using the keyboard or mouse, scrolling through webpages or documents, selecting items from a dropdown menu, and dragging and dropping files or objects. In embodiments, the process 300 can be optimized for minimal resource consumption. Additionally, in case of interruptions or significant deviations from normal operation, notifications can be provided to address any issues with the logging process promptly.

At 304, the actions logged at 302 are filtered to reduce the amount of data to a manageable level, which makes it easier to identify patterns, trends, and anomalies. Filtering is achieved through one or more filters, such as a rule-based filter, statistical filter, machine learning algorithm, or natural language processing filter. The noise filter can be configured to identify specific patterns of user behavior, use statistical methods to identify patterns and anomalies, or analyze and process natural language text data to identify patterns and extract relevant information. The filter removes noise or irrelevant actions that may not be related to the change request, which results in a cleaner dataset and enables a more targeted analysis, leading to more accurate insights and recommendations.

At 306, the filtered actions of 304 are compared to a set of prescribed actions for completion of the change request. The insight service 206 analyzes these differences to generate reconciliation insights, which can take various forms, such as identifying discrepancies, highlighting potential issues or errors, or providing feedback on the effectiveness of the prescribed actions. In some embodiments, the process 300 employs one or more algorithms, such as decision trees, clustering, regression analysis, and anomaly detection algorithms, to analyze the differences between the filtered user actions and the prescribed actions. One algorithm that can be used is a neural network trained using a supervised learning approach to predict the reconciliation insights for new sets of filtered user actions and prescribed actions. Another algorithm that can be used is a natural language processing algorithm to analyze input text and identify the most important information, which can be used to generate a summary that accurately reflects the content of the original text.

At 308, one or more notifications are generated to identify and highlight differences between the filtered actions of 304 and a set of prescribed actions for completion of the change request. These notifications can be customized based on the needs of the user. For example, if there are significant discrepancies between the filtered user actions and the prescribed actions, the process 300 can generate an alert to inform the user of the potential risk or issue. Additionally, the process 300 can be configured to update the change request with the actual steps followed and highlight any deviations from the prescribed actions. This can be useful for keeping track of the progress of the change management process and ensuring that all necessary steps are completed. Furthermore, the process 300 can identify incidents and notify relevant teams of vulnerable steps, allowing for prompt action to be taken to mitigate any perceived risks, vulnerabilities or issues.

Figure 4:
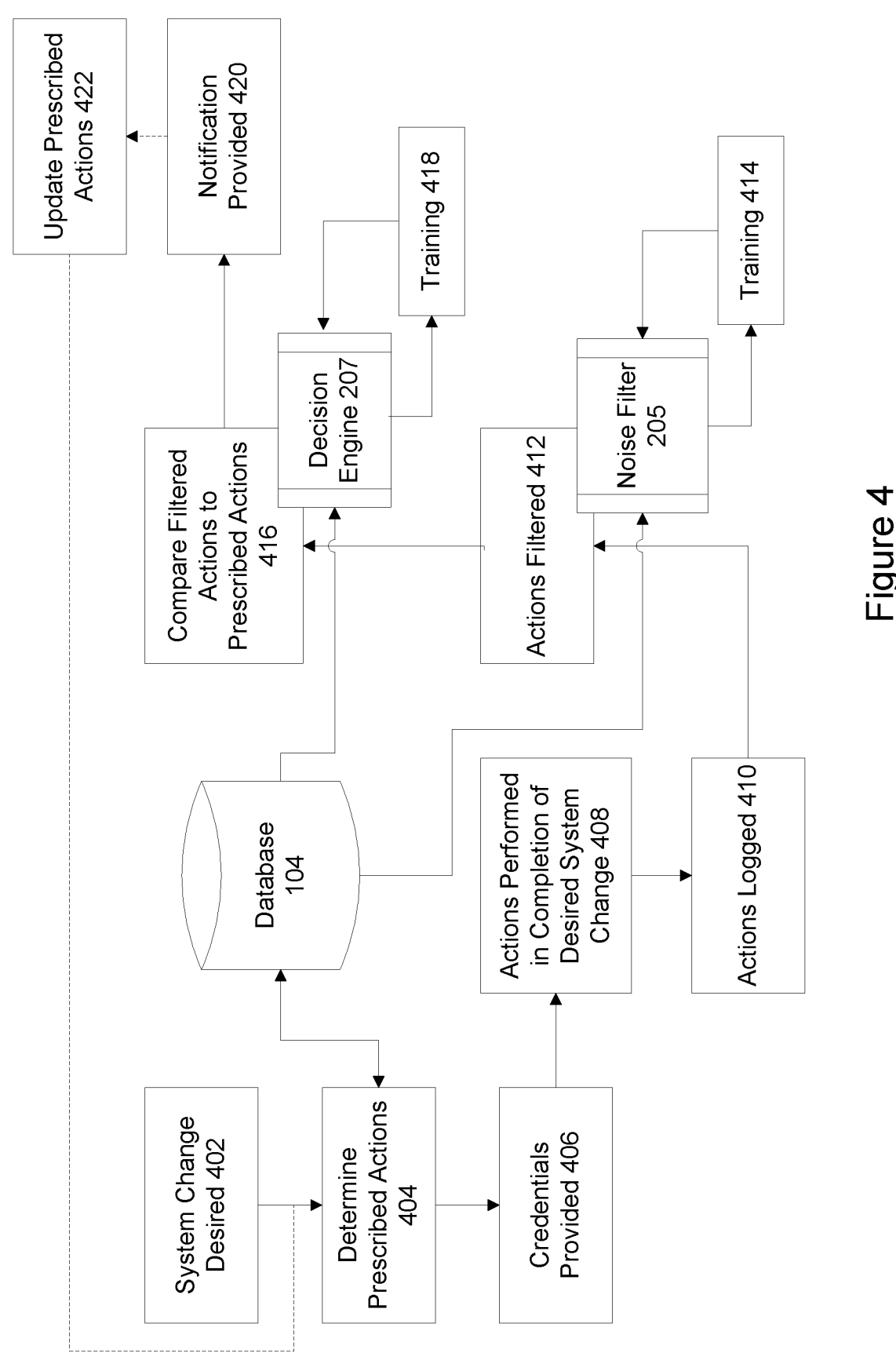
FIG. 4 shows a flowchart of an example implementation of change management intelligent reconciliation generated by the server device of FIG. 2.

Referring now to FIG. 4, a flowchart for a process 400 of evaluating of actions performed in response to a change request is depicted. This process 400 may be performed by the change management intelligent reconciliation platform 200 of FIG. 2, and may be executed as a single process or may be executed as two or more processes in parallel. Although the process 400 is described in connection with a specific example of a change request, the specific example is for illustrative purposes only, and should not be considered limiting.

A change request can refer to any request for a modification to an existing system, process, or product. For instance, suppose a financial institution, partners with a social media company, to enable users to log into the financial institution with the credentials of their social media account, rather than creating a new account with a financial institution. To facilitate this change, at 402, the system administrator is tasked with adding a new feature that enables users to log into a portal of the financial institution with their social media login.

At 404, associated documentation for the change request is completed. In particular, the change request can include a series of prescribed actions necessary to complete the task. The prescribed actions can be based on previously taken actions in response to a similar change request, standard operating procedures for implementing such a change request, a newly developed plan or procedure for implementation of the change request, actions suggested by a trained AI, ML or NLP model, etc.

In this particular example, the overall task of enabling users to log into a portal of the financial institution with their social media login is broken up into a series of subtasks, including: updating the code of the login page to include an option for social media login, testing the social media login functionality to ensure that it is working correctly, modifying the database schema to store social media login information for users, creating new user interface elements to support social media login, updating the design of the homepage of the application, adding new functionality to allow users to upload videos, changing the pricing structure of the application, and reducing the font size of the text on the login page. In this particular example, multiple administrators collaboratively work together to complete the subtasks, with each of the subtasks specified in the change request broken down into a series of prescribed actions to be performed.

At 406, each of the administrators working through respective client devices 102 provide their credentials granting them administrative rights to make changes on the server device to perform the various required actions in performance of the change request. Thereafter, at 408, each of the administrators working on the change request take various actions to complete their assigned subtasks.

At 410, the task mining agent 202 passively logs the various actions taken by the administrators. In some examples, the actions are logged at a granular level of user operation (e.g., interactions with a mouse, keystrokes on a keyboard, interacting with a touch screen, etc.). In some embodiments, the logged actions can be saved on the intelligent reconciliation database 104 or other storage medium.

In a typical course of performance of a change request, not all of the logged actions of administrators may be deemed necessary. For example, an administrator may make one or more missteps (e.g., click the wrong box, enter and then delete text, etc.), perform irrelevant or redundant actions, or generally take other actions that do not directly result in progress towards completion of an assigned subtask or prescribed action. Accordingly, at 412, the logged actions can be filtered to produce an abridged version of the logged actions more directly related to completion of the prescribed actions.

The process of filtering the actions logged involves analyzing the raw log data and selecting only the actions that are relevant to the change request being executed. The filtering process typically involves several steps to ensure that only the necessary and meaningful actions are included in the analysis. For example, the raw log data can be processed to remove any irrelevant or redundant information, which can involve removing actions that are not related to the change request, such as those related to routine maintenance or other unrelated tasks. In other examples, the logged actions can be filtered to also include irrelevant or redundant information to at least partially evaluate an efficiency of the administrator. The filtered actions can then be parsed and structured to extract key attributes such as the type of action, the time and date it was performed, and the user who performed it.

In some embodiments, the filtering at 412 can be completed by a noise filter 205, such as a AI, ML or NLP model. At 414, the AI, ML or NLP model can be trained or adapted to perform noise filtering on actions taken in response to change requests. To train an AI, ML or NLP model for noise filtering, a large dataset of actions taken in response to change requests is typically required. The dataset may include both valid and invalid actions, as well as examples of noisy or irrelevant actions. These examples are labeled accordingly to indicate whether each action is valid or invalid. The labeled dataset is then used to train the model using supervised learning, where the model learns to distinguish between valid and invalid actions by identifying patterns in the data.

The training process involves adjusting the model's internal parameters to minimize the error between the predicted and actual labels. Once the model is trained, it can be used to predict the validity of new actions taken in response to change requests, thereby filtering out any noise or irrelevant actions. The performance of the model can be evaluated using metrics such as accuracy, precision, recall, and F1 score. If the performance is not satisfactory, the model can be retrained with a larger or more diverse dataset or the model architecture can be modified.

Once the actions logged by the task mining agent are filtered and refined, at 416, the filtered actions are compared to the actions prescribed by the change request to identify any discrepancies or potential issues in the implementation of the change. One way to perform this comparison is by using an AI, ML or NLP model (e.g., decision engine 207, etc.), which is trained on a dataset of labeled examples of the correct and incorrect actions related to the change request.

At 418, the model is trained to identify patterns and relationships in the data, enabling it to distinguish between the prescribed actions and the actual actions taken by the user. For example, the supervised machine learning model can be trained on a labeled dataset where each data point consists of the filtered user actions and the set of prescribed actions related to the change request, along with the associated reconciliation insights.

During training, the model adjusts its internal parameters based on the labeled dataset to learn how to map the input (filtered user actions and prescribed actions) to the output (reconciliation insights). The trained model can then be used to predict reconciliation insights for new sets of filtered user actions and prescribed actions related to the change request. The model's predictions can then be compared to the actual insights to evaluate the model's performance.

Alternatively, an NLP model can be used to compare the filtered logged actions to the actions prescribed by the change request by breaking down the text into smaller units, identifying key topics, keywords, and phrases, and selecting the most relevant information using machine learning techniques. The NLP model then analyzes the language used in the prescribed actions and the actions taken by the user to identify any discrepancies or potential issues.

In this particular example, the model identifies that the substeps of updating the design of the homepage of the application and reducing the font size of the text on the login page, were not expressly documented in the change request, and therefore are deemed extraneous or additional steps performed by the administrators in performance of the change request. Although it may eventually be deemed that these substeps are necessary for satisfactory completion of the change request, actions associated with these substeps may initially be flagged as noncompliant.

Additionally, in this particular example, actions related to the substep of adding new functionality to allow users to upload videos are flagged as creating a potential system vulnerability, as it is determined by the model that this particular substep or series of actions in completion of the substep enable a nefarious user to upload malware, spyware or other malicious software in place of a video, thereby potentially creating a system vulnerability. Accordingly, this substep or actions associated with the substep are flagged as noncompliant.

At 420, the noncompliant actions or substeps can be communicated to the administrator or other user. For example, the notification service 208 can generate real-time alerts, summary reports (e.g., regarding an audit, compliance, vulnerability, etc.) or custom notifications to communicate noncompliant actions or substeps. These notifications can be delivered through various communication channels such as email, text message, or a messaging platform. The content of the notification can include information about the noncompliant action or substep, such as the nature of the deviation from the prescribed actions, the potential impact of the deviation on the system or process, and any recommended corrective actions.

The severity level of the vulnerability, noncompliant action or substep can also be included in the notification to help prioritize the response. Additionally, the notification can provide a link to the change request documentation or other relevant materials to facilitate the administrator's understanding of the situation and aid in decision-making. By promptly communicating noncompliant actions or substeps, the notification service 208 can help the administrator or other user take appropriate corrective actions and ensure that the change request is completed in a controlled and deliberate manner.

In some cases, the noncompliant action or substep identified by the insight service may be deemed necessary for completion of the change request, despite being outside the scope of the prescribed actions. In such cases, at 422, the prescribed actions of the change request documentation can be updated to include the noncompliant action or substep. By doing so, future change requests can rely on the updated change request documentation and avoid the need for noncompliant actions or substeps. This also helps ensure that the change management process remains controlled and deliberate, following an established protocol, while allowing for flexibility to accommodate unexpected situations that may arise during implementation. The updated change request documentation can be communicated to relevant stakeholders and incorporated into the change management process going forward.

Figure 5:
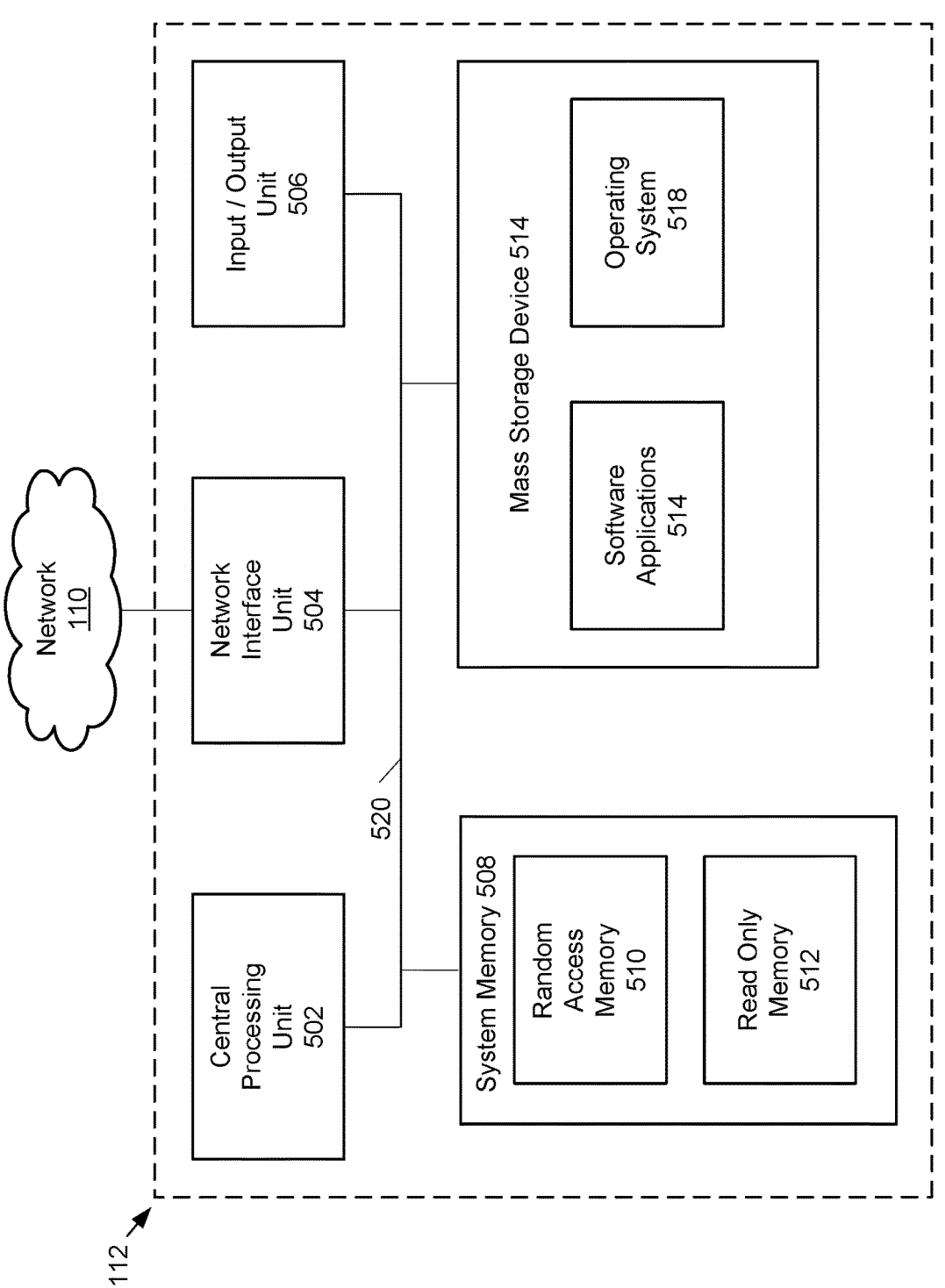
FIG. 5 shows example physical components of the server device of FIG. 2.

As illustrated in FIG. 5, the example server device 112, which provides the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the server device 112, such as during startup, is stored in the ROM 512. The server device 112 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 520. The mass storage device 514 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 504 connected to the system bus 522. It should be appreciated that the network interface unit 504 may also be utilized to connect to other types of networks and remote computing systems. The server device 112 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the server device 112 can store software instructions and data. The software instructions include an operating system 518 suitable for controlling the operation of the server device 112. The mass storage device 514 and/or the RAM 510 also store software instructions and applications 516, that when executed by the CPU 502, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system, comprising:
one or more processors; and
non-transitory computer readable storage media encoding instructions which, when executed by the one or more processors, causes the computer system to create:
a task mining agent programmed to passively log actions performed by a user related to a change request, wherein the task mining agent is configured to operate with minimal system resource consumption while running in a background;
an intelligence reconnaissance service programmed to filter the logged actions, wherein the intelligence reconnaissance service is configured to use one or more machine learning algorithms to analyze user behavior data and identify patterns and anomalies in the logged actions;
an insight service configured to analyze differences between the filtered actions and one or more prescribed actions related to the change request to generate one or more reconciliation insights; and
a notification service configured to generate one or more notifications regarding the one or more reconciliation insights, wherein the notification service is configured to generate real-time alerts during implementation of the change request, and wherein the real-time alerts identify whether actions taken during the implementation deviate from the one or more prescribed actions.

2. The computer system of claim 1, wherein the task mining agent is configured to capture user interactions and system events performed or executed by a class of users.

3. The computer system of claim 1, wherein the logged actions related to the change request include at least one of interactions with a mouse, keystrokes on a keyboard, interacting with a touch screen, selecting an option from a dropdown menu, scrolling through a webpage or document, using keyboard shortcuts to perform the logged actions, moving the mouse to a specific location on a display, dragging and dropping files or other objects, copying and pasting text or other content, or changing a layout of an interface.

4. The computer system of claim 1, wherein the task mining agent is configured to at least one of use less than about 5% of the one or more processors, use less than about 50-100 Megabytes (MB) of memory, or use less than about 100-500 MB of disk space for installation and operation when running in the background.

5. The computer system of claim 1, wherein the intelligence reconnaissance service is configured to identify activities related to the change request through contextual analysis.

6. The computer system of claim 1, wherein the one or more reconciliation insights include information regarding whether specific tasks associated with the change request have been performed.

7. The computer system of claim 1, wherein the one or more reconciliation insights include information regarding whether an action taken in response to the change request creates a system vulnerability.

8. The computer system of claim 1, wherein the insight service is configured to analyze code or configuration changes made in response to the change request for comparison to known vulnerability patterns or standards.

9. The computer system of claim 1, wherein the one or more notifications further include at least one of a summary report or a custom notification.

10. A computer program product residing on a non-transitory computer readable medium having a plurality of instructions stored thereon, which when executed by a processor, cause the processor to perform operations comprising:
passively logging, by a task mining agent, actions performed by a user related to a change request, wherein the task mining agent is configured to operate with minimal system resource consumption while running in a background;
filtering, by an intelligence reconnaissance service, the logged actions, wherein the intelligence reconnaissance service is configured to use one or more machine learning algorithms to analyze user behavior data and identify patterns and anomalies in the logged actions;
analyzing differences between the filtered actions and one or more prescribed actions related to the change request to generate one or more reconciliation insights; and
generating one or more notifications regarding the one or more reconciliation insights, wherein the one or more notifications include real-time alerts that are generated during implementation of the change request, and wherein the real-time alerts identify whether actions taken during the implementation deviate from the one or more prescribed actions.

11. The computer program product of claim 10, further comprising capturing user interactions and system events performed or executed by a class of users.

12. The computer program product of claim 10, wherein the logged actions related to the change request include at least one of interactions with a mouse, keystrokes on a keyboard, interacting with a touch screen, selecting an option from a dropdown menu, scrolling through a webpage or document, using keyboard shortcuts to perform the logged actions, moving the mouse to a specific location on a display, dragging and dropping files or other objects, copying and pasting text or other content, or changing a layout of an interface.

13. The computer program product of claim 10, further comprising identifying activities related to the change request through contextual analysis.

14. The computer program product of claim 10, wherein the one or more reconciliation insights include information regarding whether specific tasks associated with the change request have been performed.

15. The computer program product of claim 10, wherein the one or more reconciliation insights include information regarding whether an action taken in response to the change request creates a system vulnerability.

16. The computer program product of claim 10, wherein an insight service is configured to analyze code or configuration changes made in response to the change request for comparison to known vulnerability patterns or standards.

17. The computer program product of claim 10, wherein the one or more notifications further include at least one of a summary report or a custom notification.

18. A computer implemented method, executed on a computing device, comprising:

passively logging, by a task mining agent, actions performed by a user related to a change request, wherein the task mining agent is configured to operate with minimal system resource consumption while running in a background;

filtering, by an intelligence reconnaissance service, the logged actions, wherein the intelligence reconnaissance service is configured to use one or more machine learning algorithms to analyze user behavior data and identify patterns and anomalies in the logged actions;

analyzing differences between the filtered actions and one or more prescribed actions related to the change request to generate one or more reconciliation insights; and generating one or more notifications regarding the one or more reconciliation insights, wherein the one or more notifications include real-time alerts that are generated during implementation of the change request, and wherein the real-time alerts identify whether actions taken during the implementation deviate from the one or more prescribed actions.

* * * * *